United States Patent

Hirai et al.

[11] Patent Number: 5,812,502
[45] Date of Patent: Sep. 22, 1998

[54] OPTICAL DISC READING DEVICE

[75] Inventors: Akio Hirai; Kenichiro Takeshita, both of Hamamatsu, Japan

[73] Assignee: Yamaha Corporation, Hamamatsu, Japan

[21] Appl. No.: 884,227

[22] Filed: Jun. 27, 1997

[30] Foreign Application Priority Data

Jul. 19, 1996 [JP] Japan .................................. 8-208999

[51] Int. Cl.$^6$ .................................................. G11B 17/22
[52] U.S. Cl. ................................................. 369/32; 369/58
[58] Field of Search ................................... 369/32, 56, 54, 369/57, 47, 48, 58, 55, 33, 59, 60

[56] References Cited

U.S. PATENT DOCUMENTS

5,694,383  12/1997  Arataki et al. .......................... 369/59
5,701,282  12/1997  Matsumoto et al. ...................... 369/32

*Primary Examiner*—Ali Neyzari
*Attorney, Agent, or Firm*—Pillsbury Madison & Sutro LLP

[57] ABSTRACT

Each data read out from an optical disk is written into a RAM in response to a reproduced clock signal and then read out from the RAM in response to a reference clock signal. A decoder circuit detects a Run-out block in a data link period of the read-out data. Once such a Run-out block is detected, a timing resetting circuit compulsorily moves write and read pointers to the RAM to middle address and first address locations, respectively, of the RAM, so as to restore a distance between the two pointers to a predetermined basic distance corresponding to substantially half the total number of addresses of the RAM. With this arrangement, it is possible to avoid an overflow or underflow in the RAM that would result from the clock reproduction getting out of phase-locking by a phase locked loop during optical scanning in a data link period.

3 Claims, 9 Drawing Sheets

FIG. 7A (a) OUTSIDE DATA LINK PERIOD

FIG. 7B (b) WITHIN DATA LINK PERIOD (EFMSYNC RESUMED)

FIG. 10A WHEN READING USER DATA

FIG. 10B AFTER SCANNING LINK BLOCK

FIG. 10C WHEN MOVING BACK TO BASE ADDRESS

OPTICAL DISC READING DEVICE

BACKGROUND OF THE INVENTION

The present invention relates generally to optical disc reading devices for reproducing data recorded on an optical disc in such a format which includes a so-called "data link period" having a set of recording areas, Run-out, Link and Run-in and a user-data recording area interposed between the data link periods, and the present invention relates more particularly to an improved optical disc reading device which can prevent destruction of read-out data by effectively avoiding an overflow or underflow in a RAM, used as a data buffer, that would result from the clock signal reproduction being disturbed in a "link position" during the data reading by the device.

Figure 2:
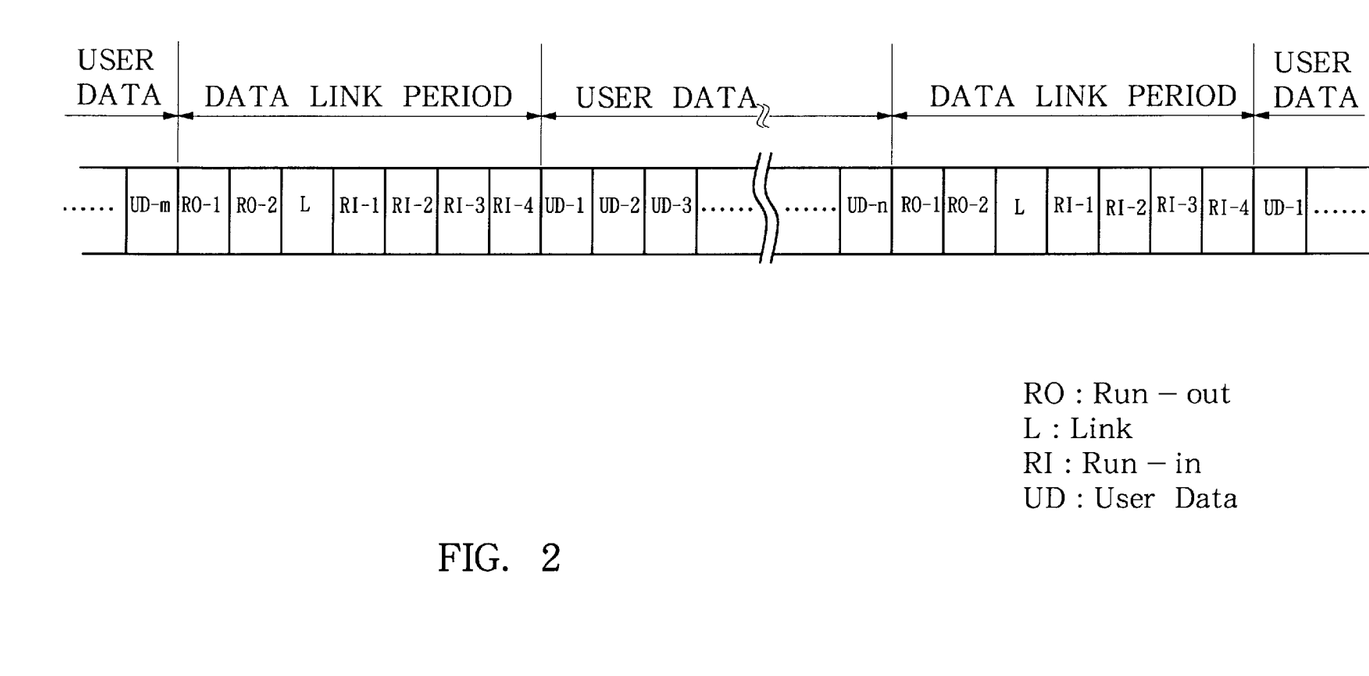
FIG. 2 is a diagram showing an exemplary recording format on a CD-R or CD-E.

Generally, optical discs, such as CD-Rs (CD-Recordables) and CD-Es (CD-Erasables: phase-change type optical discs), have data link periods in which data are "linked". In CD-Rs or CD-Es, for example, a set of recording areas, Run-out, Link and Run-in, is provided as a so-called "data link period", and user data are recorded between these data link periods, as shown in FIG. 2.

In cases where individual blocks (sectors) of user data are recorded dispersedly after being interleaved in accordance with the CIRC (Cross Interleave Reed-Solomon Code) technique, the Run-out area is for accommodating or absorbing expansion of the dispersed data to prevent them from entering the Link area, and the Run-out area in each of the data link periods comprises two blocks (RO-1 and RO-2). The link area is a physical EFM signal linking portion and comprises just one block. The Run-in area is a "runway" section to accept user data and comprises four blocks (RI-1 to RI-4). In the CD medium, valid data are user data and those recorded on the Run-out area, but data recorded on the Link and Run-in areas are invalid or useless as user data. Identification information is recorded at the beginning of each of the blocks in the data link period, as block header information indicating which of the Run-out, Link and Run-in areas that block belongs to.

Figure 3:
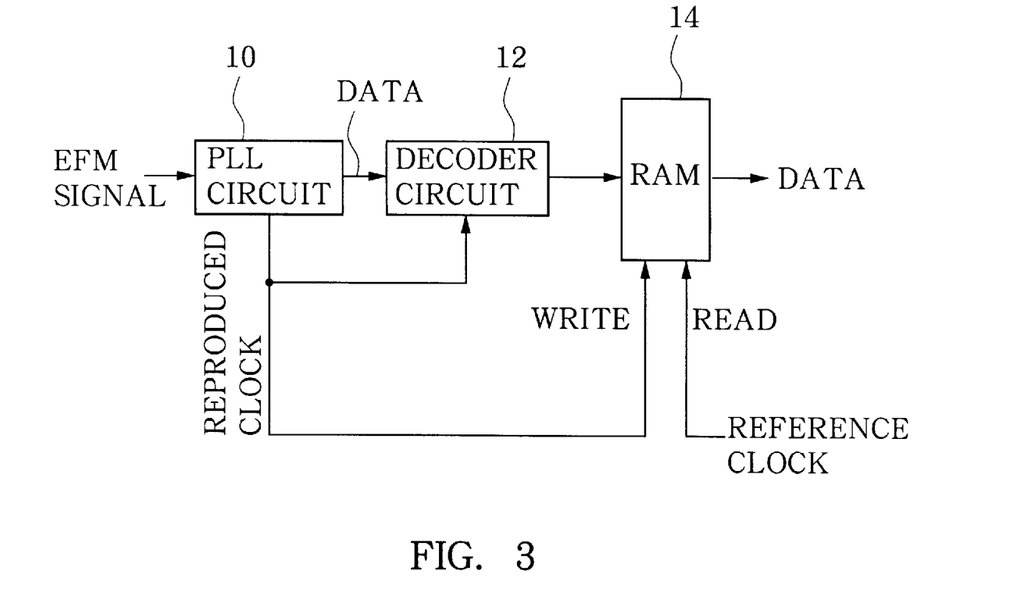
FIG. 3 is a block diagram showing a conventionally-known optical disc reading device.

In FIG. 3, there is shown a conventionally-known optical disc reading device of the above-mentioned type. Each EFM (Eight to Fourteen Modulation) signal read out from an optical disc via an optical pickup is fed to a PLL (Phase Locked Loop) circuit 10 to reproduce a clock signal. The PLL circuit 10 also passes the EFM signal to a decoder circuit 12, where the signal is EFM-demodulated with the reproduced clock signal. The demodulated data is temporarily stored into a RAM (data buffer) 14 in response to the reproduced clock signal, and then the temporarily stored data are sequentially read out from the RAM 14 in response to to reference clock signals of predetermined constant frequency based on output pulses from a quartz crystal oscillator (not shown). Each data read out from the RAM 14 is demodulated by a next-stage decoder circuit (not shown). Here, the RAM 14 functions to absorb jitter (time-base error) of the EFM signals.

Figure 4:
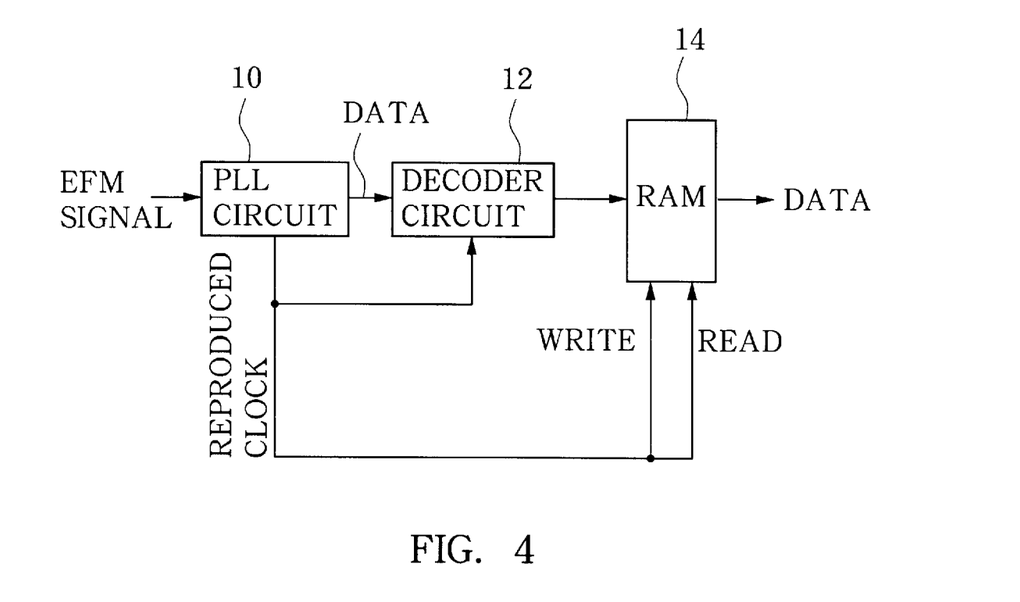
FIG. 4 is a block diagram showing another conventionally-known optical disc reading device.

In FIG. 4 there is shown another conventionally-known optical disc reading device of the above-mentioned type, where data writing and data reading to and from the RAM 14 are both conducted in response to reproduced clock pulses. Here, the RAM 14 functions as a buffer to accommodate differences or deviations between the write and read pointers (write and read addresses).

Figure 5:
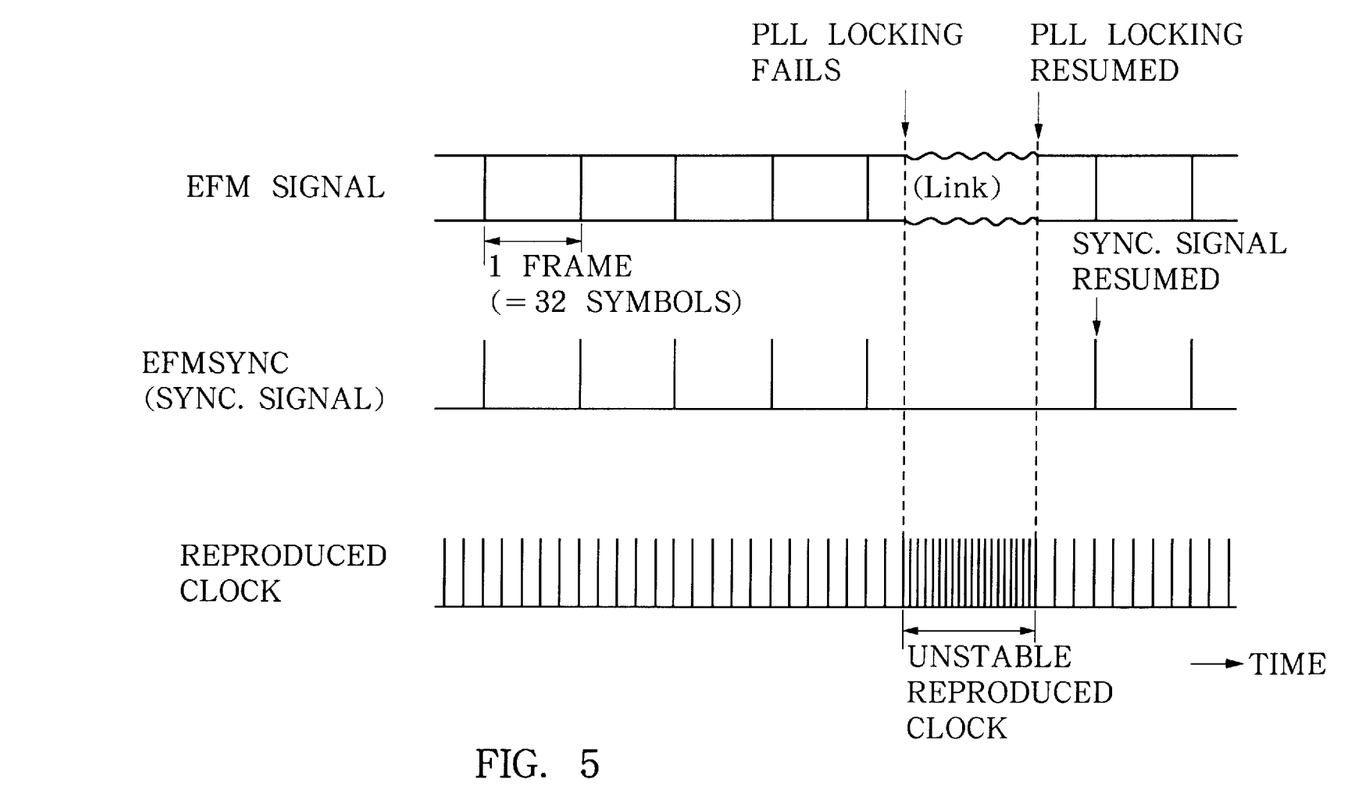
FIG. 5 is a time chart showing a manner in which signals are reproduced from a data link period.

In the optical disc reading devices for reproducing linked data from an optical disc, it is necessary to read the data in a stable condition even after the optical pickup has passed or optically scanned each data link period. However, because data are recorded discontinuously in each data link period (data before and after the data link period are interleaved separately) and unwanted abnormal waveforms are introduced by overwriting of the EFM signals in the Link block, the EFM signals would get out of phase-locking by the PLL circuit 10 when the optical pickup scans the Link block. As a result, the reproduced clock signals would become unstable as shown in FIG. 5, so that the data writing into the RAM 14 (in the circuitry of FIG. 4, both the data writing and the data reading) is carried out in response to these unstable reproduced clock signals until the appropriate phase-locking state of the the PLL circuit 10 is restored.

Thus, in the illustrated circuitry of FIG. 3, the rates of the data writing and data reading to and from the RAM 14 may get out of order to such a great degree that the write and read pointers get close to each other. Specifically, when the writing rate is higher than the reading rate, the RAM 14 would overflow, which results in new data being overwritten over older or previously-written data that have not yet been read out from the RAM 14. When the writing rate is lower than the reading rate, the RAM 14 would underflow, which results in already-read data being read out duplicatively from the RAM 14. In either case, data consistency or integrity would be lost and the data tends to be read out from the RAM 14 in an incomplete or broken state (this condition is called data destruction).

Figure 6:
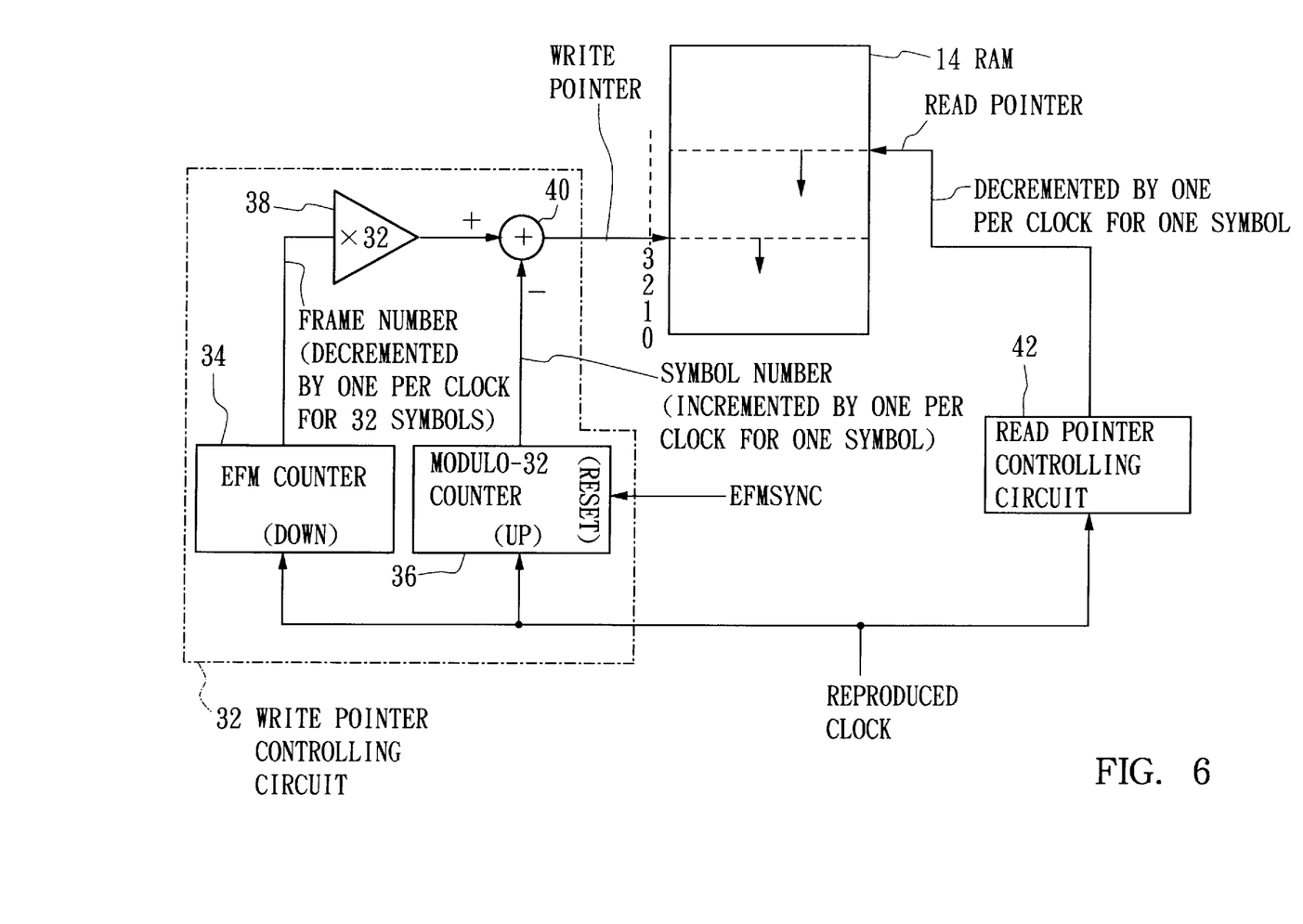
FIG. 6 is a block diagram showing a system for controlling write and read pointers to a RAM employed in the known optical disc reading device of FIG. 4.

In the illustrated circuitry of FIG. 4 as well, similar problems arise when the phase-locking of the PLL circuit 10 fails and the write and read pointers get close to each other, as will be described below. FIG. 6 is a block diagram showing a system for controlling the write and read pointers to the RAM 14. A write pointer controlling circuit 32 includes an EFM counter 34 and a modulo-32 counter 36. The EFM counter 34, which counts reproduced clock signals, decrements its output value by one each time it has counted the reproduced clock signals for 32 symbols (=one frame). Therefore, the EFM counter 34 outputs a value corresponding to a frame number of the EFM signals counted.

The modulo-32 counter 36, which also counts reproduced clock signals, increments its output value by one each time it has counted the reproduced clock signal for one symbol. After the output value of the counter 36 has reached "31", the counter 36 is returned to an initial count value of "0" to repeat the counting operation. Also, each time synchronizing signal EFMSYNC located at the beginning of each frame of the EFM signals (see FIG. 5) is detected, the modulo-32 counter 36 is reset to "0" to restart the counting.

The output value of the EFM counter 34 is multiplied by a weight "32" via a multiplier 38 and then fed to a subtracter 40, which subtracts the output value of the modulo-2 counter 36 from the weighted value from the multiplier 38. The output value of the subtracter 40 is provided as a value of the write pointer to the RAM 14. A read pointer controlling circuit 42, which also counts reproduced clock signals, decrements its output value by one each time it has counted the reproduced clock signal for one symbol. The output value of the read pointer controlling circuit 42 is provided as a value of the read pointer to the RAM 14.

Figure 7A:
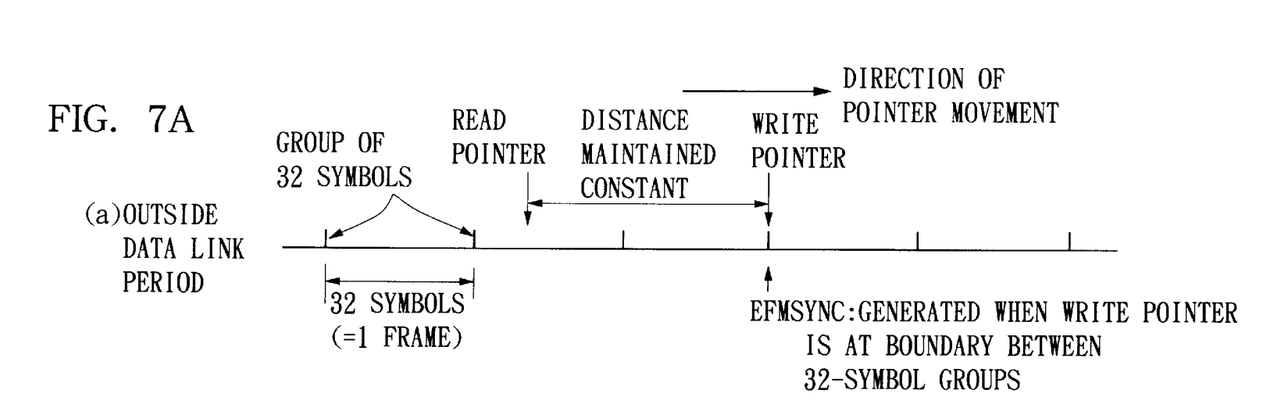
FIGS 7a–7b are a time chart explanatory of operation of the write and read pointers controlled by the system of FIG. 6.

As long as the PLL circuit 10 is in the proper phase-locking state, synchronizing signal EFMSYNC is detected at a time point when the write pointer is located at the boundary between two adjacent blocks of 32 EFM signal symbols (i.e., when the modulo-32 counter 36 is returned from the maximum output value "31" to the initial value "0") as shown in FIG. 7A, so that a distance between the write and read pointers is maintained constant. However, once the phase-locking of the PLL circuit 10 fails in the Link block of the data link period, the reproduced clock signals become unstable and the data writing and data reading to and from the RAM 14 are conducted in response to the unstable reproduced clock signals, during which time no synchronizing signal EFMSYNC may be detected or noise or the like may be erroneously detected as the synchronizing signal EFMSYNC. But, as soon as the optical pickup leaves the Link block and the proper locking state of the PLL circuit 10 is resumed, a proper detection of the synchronizing signal EFMSYNC is resumed, as shown in FIG. 5.

Figure 7B:
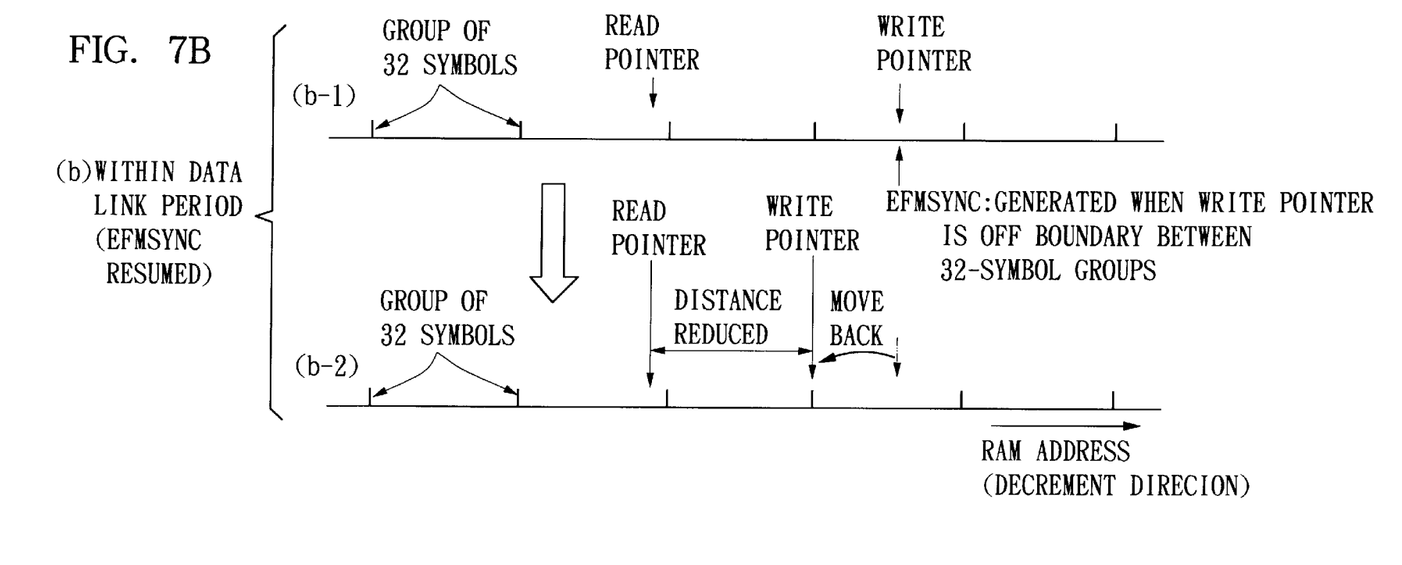

Because the data writing and data reading to and from the RAM 14 were conducted in response to the unstable reproduced clock signals, synchronizing signal EFMSYNC, after the resumption, is detected at a point when the write pointer is located off the boundary between the 32-symbol groups (i.e., when the modulo-32 counter 36 has not yet been returned to the initial output value "0"), and thus the counter 36 is reset undesirably when its output value is other than "0", as shown in column "b-1" of FIG. 7B. Therefore, the write pointer is moved back to the preceding boundary between the 32-symbol groups as shown in column "b-2" of FIG. 7B, from which the pointer again advances in response to reproduced clock signals. During that time, the read pointer keeps advancing so that the deviation between the write and read pointers can be reduced.

Repeating the above-mentioned operations for each of the Link blocks, however, would cause the write and read pointers to get close to each other, which in turn would lead to an overflow or underflow in the RAM 14. The overflow of the RAM 14 would result in new data being overwritten over those data that have not yet been read out from the RAM 14, while the underflow would result in already-read data being read out duplicatively from the RAM 14. In either case, data consistency or integrity would be lost and the data would be read out from the RAM 14 in an incomplete or broken state (this condition is called data destruction).

SUMMARY OF THE INVENTION

It is therefore an object of the present invention to provide an optical disc reading device which is capable of preventing destruction of read-out data when the optical pickup scans a data link period on the disc.

In order to accomplish the above-mentioned object, the present invention provides an optical disc reading device which is characterized by detecting a Run-out block during data reading from an optical disc so as to anticipate arrival of a next Link block that is a physical EFM signal linking portion and then compulsorily restoring a distance between write and read pointers to a RAM (or buffer memory) to a predetermined basic distance.

By properly determining the basic distance between the write and read pointers to the RAM, it is possible to gain a sufficient preventive margin against an overflow or underflow in the RAM. Even when the clock reproduction gets out of the phase-locking by a PLL circuit to provide unstable reproduced clock signals as the optical pickup scans a Link block in a data link period, the sufficient margin prevents occurrence of an overflow or underflow in the RAM after optical scanning in the data link period and destruction of data read out from the RAM (i.e., user data following the data link period).

Compulsorily restoring the distance between write and read pointers to the predetermined basic distance could result in some data, stored in the Link or Run-in block, being dropped or read out duplicatively from the RAM after the restoration; however, the dropping or duplicative readout of the data does not adversely influence reading of user data because they are data of the Link or Run-in block which are invalid or useless as user data.

Further, in one preferred implementation, the predetermined basic distance is a specific one corresponding to substantially half the total number of addresses in the RAM. This arrangement can afford substantially uniform preventive margins against the overflow and underflow.

Furthermore, in one preferred implementation, respective base address locations for the write and read pointers are set in advance to provide the predetermined basic distance. When a Run-out block is detected, the write and read pointers are moved back to the respective base address locations to thereby restore the predetermined basic distance. With this arrangement, it is only necessary to always move the two pointers back to fixed base address locations irrespective of the positions of the pointers before the distance restoration, which greatly facilitates control of the pointers.

BRIEF DESCRIPTION OF THE DRAWINGS

The preferred embodiments of the present invention will be described with reference to the accompanying drawings, in which.

DETAILED DESCRIPTION OF THE PREFERRED EMBODIMENTS

Figure 1:
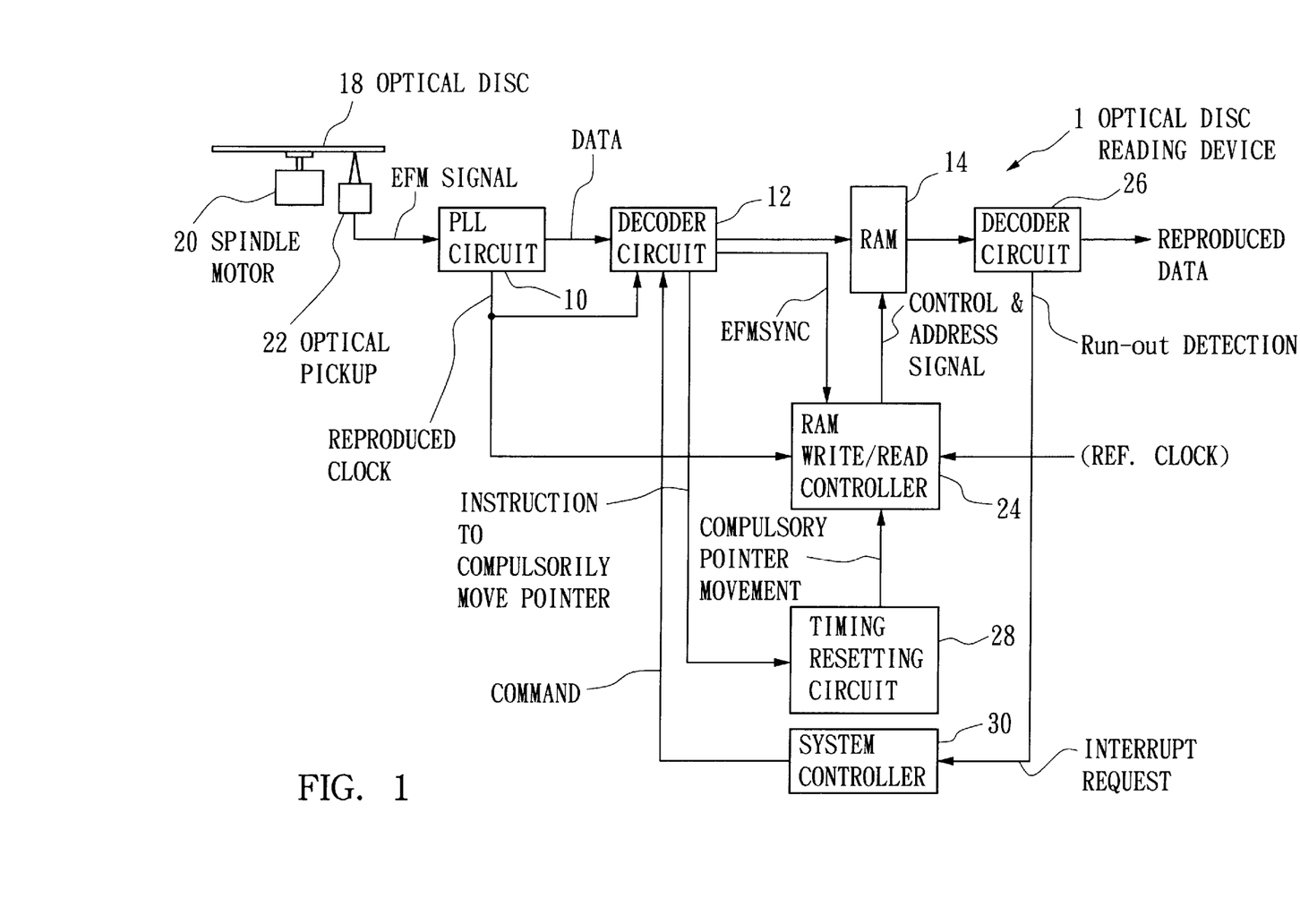
FIG. 1 is a block diagram showing an exemplary hardware setup of an optical disc reading device in accordance with an embodiment of the present invention.

FIG. 1 is a block diagram showing an exemplary hardware setup of an optical disc reading device in accordance with a preferred embodiment of the present invention. In the illustrated embodiment, an optical disc 18 is a conventional CD-R or CD-E, on which data (EFM signals) are recorded in the format as shown in FIG. 2. The optical disc 18 is driven to rotate via a spindle motor 20 so that the recorded signals are sequentially read out by an optical pickup 22.

Each EFM signal read out from the optical disc 18 is fed to a PLL (Phase Locked Loop) circuit 10 to reproduce a clock signal. The PLL circuit 10 also passes the EFM signal to a decoder circuit 12, where the signal is EFM-demodulated with the reproduced clock signal. A write/read controller 24 performs control such that the demodulated data is temporarily stored into a RAM 14 in response to the reproduced clock signal an then the temporarily stored data are sequentially read out from the RAM 14 in response to to reference clock signals of regular frequency based on output pulses from a quartz crystal oscillator (not shown). Alternatively, both the data writing and the data reading to and from the RAM 14 may be conducted, under the control of the controller 24, using reproduced clock signals.

Namely, under the control of the controller 24, the RAM 14 functions as a circulating memory, where the write and read pointers operate independently of each other; the write pointer is incremented by one each time data is written into an address of the RAM 14, while the read pointer is incremented by one each time data is read out from an address of the RAM 14. When these pointers reaches the last address of the RAM 14, they are automatically moved back to the first address location of the RAM 14 upon being next incremented by one. In this way, the RAM 14 sequentially stores data (user data and data of each data link period) supplied in response to reproduced clock signals in place of oldest data stored in the RAM 14 (already read-out data), and sequentially reads out the stored data in an oldest-data-first-out fashion.

Each data read out from the RAM 14 is demodulated ("deinterleaved") by another decoder circuit 26 to provide reproduced data (user data). Also, the decoder circuit 26 detects a Run-out block from among block header identification information, so as to issue an interrupt request to a system controller 30. In response to the interrupt request, the system controller 30 sends a command to the decoder circuit 12, which in turn issues a reset instruction to a timing resetting circuit 28.

When the reset instruction is received from the decoder circuit 12, i.e., when a Run-out block is detected by the decoder circuit 26, the timing resetting circuit 28 compulsorily moves the write and read pointers back to respective predetermined base or start address locations of the RAM 14 upon arrival of a Run-in block associated with the Run-out block. Thus, even when the clock signal reproduction is temporarily disturbed in a Link block succeeding the Run-out block and some deviation between the reproduced clock signals and the reference clock signals occurs, due to eccentricity of the disk, wow and flutter, etc., after the clock signal reproduction is brought back to normal in the following Run-in block, succeeding user data can be written and read to and from the RAM 14 without causing an overflow or underflow in the RAM 14. As a consequence, the data can be appropriately reproduced without unwanted data destruction.

According to the present embodiment, the base address location to which the write pointer is compulsorily moved back is a virtually middle address of the RAM 14, while the base address location to which the read pointer is compulsorily moved back is the first address of the RAM 14. This way, the two pointers are set to cover a substantially same length of the RAM 14, so that practically uniform preventive margins can be allotted to the two pointers against a possible overflow and underflow in the RAM 14.

Figure 8:
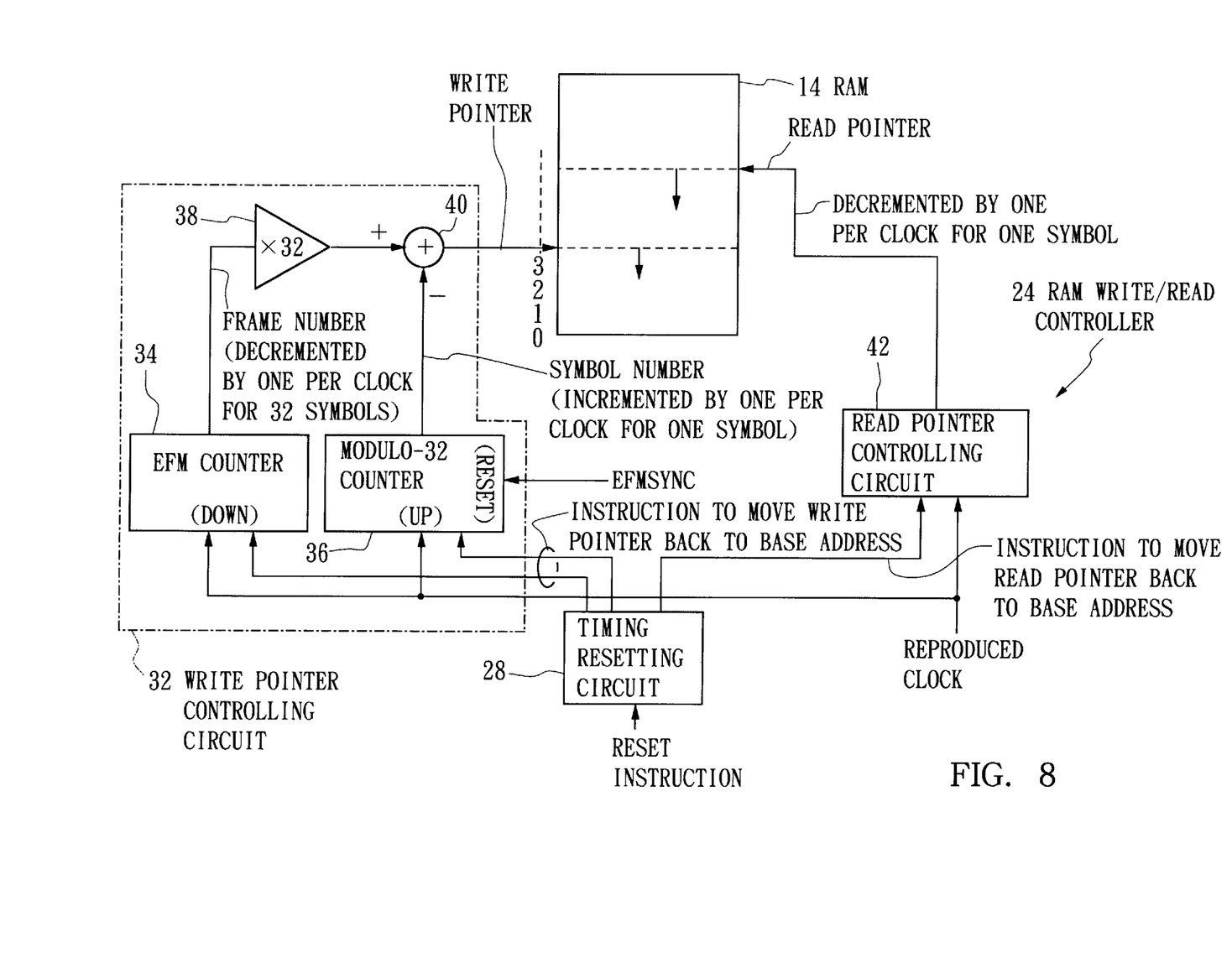
FIG. 8 is a block diagram showing an exemplary hardware setup of a controller for controlling data writing and data reading to and from the RAM of FIG. 1.

In the case where the reproduced clock signals are used for both the data writing and the data reading to and from the RAM 14, the write/read controller 24 may be arranged in a manner as shown in FIG. 8. In FIG. 8, elements similar to those in the conventionally-known circuitry of FIG. 6 are denoted by same reference characters as in the figure. The write/read controller 24 of FIG. 8 includes a write pointer controlling circuit 32 and a read pointer controlling circuit 42. Upon receipt of a reset instruction issued when a Run-out block is detected, the timing resetting circuit 28 issues an instruction to the EFM counter 34 and modulo-32 counter 36, of the write pointer controlling circuit 32, to cause these counters move back to a count value corresponding to the predetermined base address location. The timing resetting circuit 28 also issues an instruction to the read pointer controlling circuit 42 to cause the read pointer to move back to its predetermined base address location. In response to such instructions, the write and read pointers are moved back to their respective base address locations. Other operations of the circuitry of FIG. 8 are similar to those described in relation to the conventional circuitry of FIG. 6.

Figure 9:
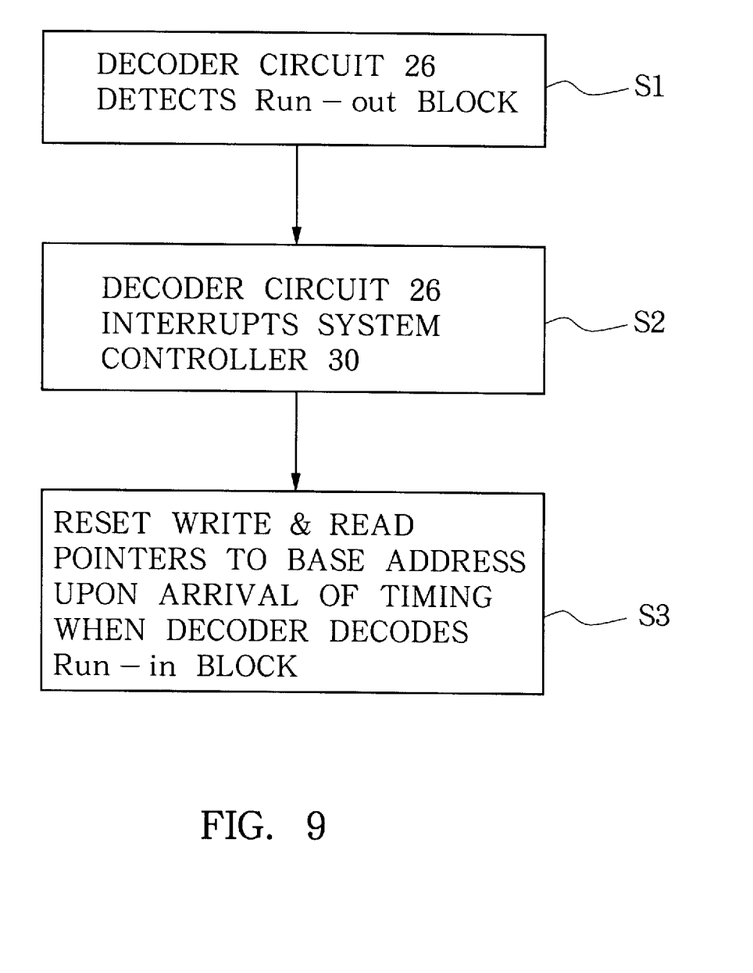
FIG. 9 is a flowchart of a control sequence executed when the optical disc reading device of FIG. 1 scans a data link period.

Now, with reference to the flowchart of FIG. 9, a description will be made about exemplary control executed by the optical disc reading device 1 when the optical pickup 22 scans a data link period. Each time a Run-out block is detected at step S1, the decoder circuit 26 issues an interrupt signal to the system controller 30 at step S2. In response to the interrupt signal, the system controller 30 moves the write and read pointers to the RAM 14 back to their respective base address locations upon arrival of such timing at which the decoder circuit 12 decodes an associated Run-in block by way of the Link block.

Figure 10A:
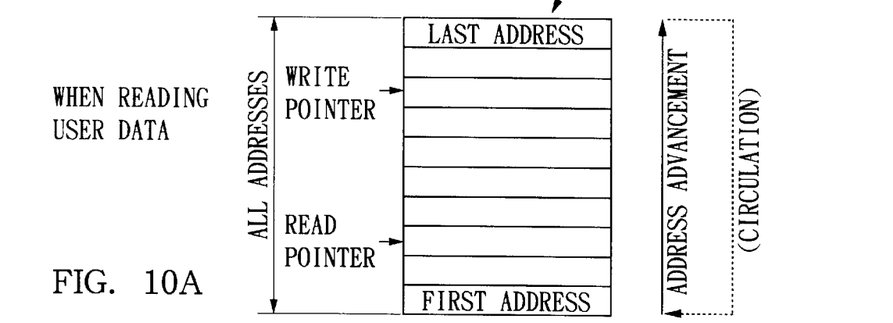
FIGS. 10A to 10C are diagrams explanatory of exemplary operation of the write and read pointers controlled by the controller of FIG. 8.
Figure 10B:
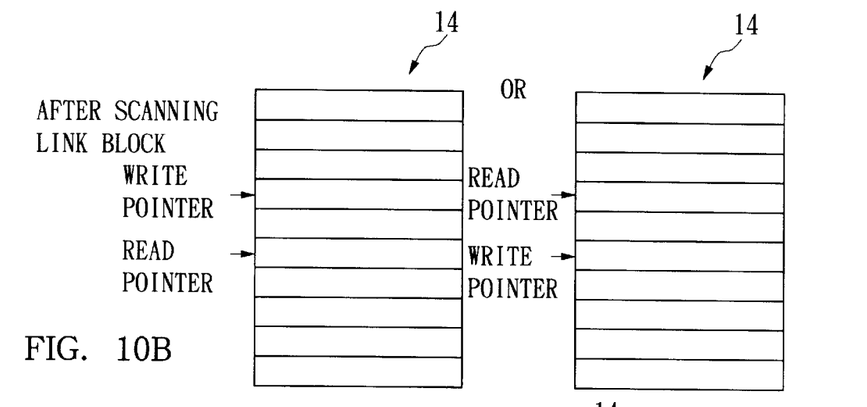
Figure 10C:
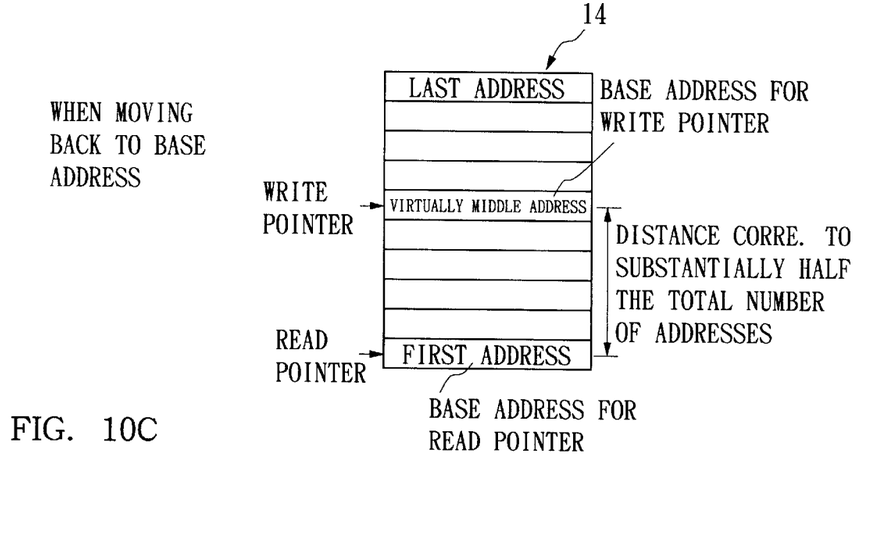

FIGS. 10A to 10C are explanatory of exemplary operation of the write and read pointers controlled by the write/read controller 24 of FIG. 8. Before the data link period is reached, the read address follows the write address with some distance as shown in FIG. 10A. However, in optically scanning the Link block of the data link period, the clock reproduction gets out of the phase-locking by the PLL, circuit to provide unstable reproduced clock signals, and consequently the write and read pointers tend to quickly get close to each other as shown in FIG. 10B in the case where the reference clock signals are used as the reading clock signals. Thus, if the data reading continues in this condition, it is not possible to properly accommodate a deviation between the reproduced clock signals and the reference clock signals occurring, due to eccentricity of the disk, wow and flutter, etc., after the clock signal reproduction is brought back to normal in the following Run-in block. This would result in an overflow or underflow of the RAM 14.

Further, in the case where the reproduced clock signals are used for both the data writing and the data reading, the write and read pointers get close to each other as shown in FIG. 10B because the write pointer is brought back to at the boundary between the 32 EFM signal symbols when the proper phase locking by the PLL circuit and hence detection of synchronizing signal EFMSYNC is resumed. By repetition of the above-mentioned operations each time the optical pickup passes or scans a Link block, the positional relation between the write and read pointers is reversed and thus an overflow or underflow results in the RAM 14.

To avoid such inconveniences, the preferred embodiment is arranged to compulsorily move the write pointer to a virtually middle address of the RAM and the read pointer to the first address of the RAM 14 in a Run-in block following the Link block so that the two pointers are placed apart from each other by a predetermined distance corresponding to half the total number of addresses in the RAM 14, as shown in FIG. 10C. This arrangement permits a significantly increased preventive margin against the occurrence of an overflow (caused by the write pointer outrunning the read pointer) or underflow (caused by the read pointer outrunning the write pointer) in the RAM 14.

After the write and read pointers are compulsorily brought back to the respective base address locations as noted above, the writing of the data from the Run-in block is resumed at the base address of the write pointer, so that user data following the Run-in block can be accurately written into the RAM 14 from the very beginning of the data. By virtue of the sufficient preventive margin set against an overflow or underflow in the RAM 14, it is possible to properly accommodate a deviation between the reproduced clock signals and the reference clock signals occurring, due to eccentricity of the disk, wow and flutter, etc., in the case where the reference clock signals are used as the data reading clock signals, to thereby effectively avoid destruction of the user data following the data link period.

Whereas the preferred embodiment has been described above as setting the base address locations of the write and read pointers to be placed apart from each other by a distance corresponding-to half the total number of addresses in the RAM 14, the respective base address locations may be set to any other suitable locations depending on which of the overflow and underflow tends to occur more frequently. Further, whereas the preferred embodiment has been described above as compulsorily moving both of the write and read pointers, one of the two pointers may be fixed so that only the other pointer is compulsorily moved with respect to the one or fixed pointer to provide a predetermined distance therebetween.

The present invention as has been described so far in connection with the preferred embodiment, permits continued stable data reading even after optical scanning in a data link period.

What is claimed is:

1. An optical disk reading device for reproducing information recorded on an optical disc in a format which includes a data link period having a set of Run-out, Link and Run-in recording areas and a user-data recording area interposed between the data link periods, said optical disk reading device comprising:

an optical pickup for reading out the information from the optical disc;

a memory for temporarily storing therein the information read out by said optical pickup;

a clock reproducing section for reproducing clock signals contained in signals read out by said optical pickup, by use of a phase locked loop circuit;

a write and read controller for, in response to the clock signals reproduced by said clock reproducing section, sequentially storing the information, currently read out by said optical pickup, into said memory in place of older information previously stored in said memory, and for, in response to the reproduced clock signals or reference clock signals generated by an oscillator circuit separate from said clock reproducing section, sequentially reading out the information from said memory in an oldest-information-first-out fashion;

a block detector for detecting a Run-out block from among the information currently read out from said memory; and compulsory pointer moving section for compulsorily moving either or both of write and read pointers to said memory which are provided via said write and read controller in such a manner that a distance between the write and read pointers is restored to a predetermined basic distance.

2. An optical disk reading device as recited in claim 1 wherein said compulsory pointer moving section sets, as the predetermined basic distance, a specific distance corresponding to substantially half a total number of addresses in said memory.

3. An optical disk reading device as recited in claim 1 wherein said compulsory pointer moving section restores the distance between the write and read pointers to said predetermined basic distance by compulsorily moving the write and read pointers to respective predetermined base address locations in said memory.

* * * * *